(12) United States Patent
Sorani et al.

(10) Patent No.: US 7,730,800 B2
(45) Date of Patent: Jun. 8, 2010

(54) POWER UNIT

(75) Inventors: Hiroshi Sorani, Saitama (JP); Kinya Mizuno, Saitama (JP); Yasushi Fujimoto, Saitama (JP); Ken Oike, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 562 days.

(21) Appl. No.: 11/710,394

(22) Filed: Feb. 26, 2007

(65) Prior Publication Data
US 2008/0023291 A1 Jan. 31, 2008

(30) Foreign Application Priority Data
Feb. 27, 2006 (JP) .............................. 2006-050508

(51) Int. Cl.
*F16H 3/08* (2006.01)

(52) U.S. Cl. ............................ 74/331; 74/329; 74/337.5

(58) Field of Classification Search ................... 74/335, 74/337, 337.5, 325, 329, 331, 355, 361, 373, 74/376, 377
See application file for complete search history.

(56) References Cited
U.S. PATENT DOCUMENTS
4,593,782 A 6/1986 Nobusawa et al.
6,443,278 B1 * 9/2002 Hori et al. ................... 192/3.58
6,763,736 B2 * 7/2004 Hori et al. ....................... 74/329
2003/0131676 A1 7/2003 Nishi et al.
2006/0011006 A1 * 1/2006 Suzuki et al. .............. 74/473.1
2007/0068297 A1 * 3/2007 Hori et al. ...................... 74/335

FOREIGN PATENT DOCUMENTS
GB 1192530 A 5/1970
JP 2002-357267 A 12/2003

* cited by examiner

*Primary Examiner*—David D Le
(74) *Attorney, Agent, or Firm*—Birch, Stewart, Kolasch & Birch, LLP

(57) ABSTRACT

A small center distance is provided between a crankshaft and a gearshift shaft disposed in parallel. A power unit is built compactly in a direction of arrangement of the crankshaft and the gearshift shaft for supporting reliably the gearshift shaft on which heavy, first and second gearshift clutches are supported. A transmission includes a main shaft, disposed in parallel with a crankshaft and rotatably supported in a crankcase, and first and second gearshift clutches. The first and second gearshift clutches change a gearshift position in a first gearshift portion and a gearshift position in a second gearshift portion, respectively. The main shaft includes an outer shaft portion that extends from the crankcase and supports the first and second gearshift clutches. The outer shaft portion is supported by a bearing portion disposed in a front cover on a side opposite to the crankcase across the first and second gearshift clutches.

19 Claims, 6 Drawing Sheets

POWER UNIT

CROSS-REFERENCE TO RELATED APPLICATIONS

The present application claims priority under 35 USC 119 to Japanese Patent Application No. 2006-050508 filed on Feb. 27, 2006 the entire contents of which are hereby incorporated by reference.

BACKGROUND OF THE INVENTION

1. Field of the Invention

The present invention relates to a power unit that includes an engine and a transmission, in which gears are changed using first and second gearshift clutches.

2. Description of Background Art

A power unit is known that includes a transmission having first and second gearshift clutches. The first and second gearshift clutches transmit or disconnect power from an engine to first and second gearshift portions, respectively. These gearshift clutches achieve a change of gears. See, for example, Japanese Patent Laid-Open No. 2002-357267.

In the power unit having the transmission that includes the first and the second gearshift clutches, the transmission may be arranged to have a gearshift shaft disposed in parallel with an output shaft (e.g., a crankshaft) of the engine in order to build a smaller power unit in an axial direction of the engine output shaft. If, at this time, the gearshift clutches are disposed inside a crankcase that rotatably supports the crankshaft, the gearshift shaft that supports the heavy gearshift clutches is reliably supported by the crankcase at a position of sandwiching the gearshift clutches. Contrary to this advantage of the known art, a center distance between the crankshaft and the gearshift shaft becomes greater so that interference can be avoided between the crankshaft and the gearshift clutches having a relatively large diameter. This results in the power unit becoming larger in a direction of arranging the crankshaft and the gearshift shaft.

SUMMARY AND OBJECTS OF THE INVENTION

The present invention has been made to solve the foregoing problems. In accordance with embodiments of the present invention, it is an object of the embodiments of the present invention to allow a center distance between a crankshaft and a gearshift shaft, that are disposed in parallel with each other, to be kept small. Thus, a power unit can be built compactly in a direction of the arrangement of the crankshaft and the gearshift shaft and the gearshift shaft. In addition, the gearshift is reliably supported on which heavy, first and second gearshift clutches are supported. According to another embodiment of the present invention, operational stability of the first and the second gearshift clutches is improved.

A power unit according to an embodiment of the present invention includes an engine having a crankcase rotatably supporting a crankshaft and a transmission changing the speed of the power of the crankshaft. The transmission includes a gearshift shaft, first and second gearshift portions, a first gearshift clutch, and a second gearshift clutch. The gearshift shaft is disposed in parallel with the crankshaft and rotatably supported in the crankcase. The first and second gearshift portions change a speed of the power from the crankshaft. The first gearshift clutch transmits and disconnects the power relative to the first gearshift portion. The second gearshift clutch transmits and disconnects the power relative to the second gearshift portion. The first and second gearshift clutches change a gearshift position in the first gearshift portion and the second gearshift portion. The gearshift shaft includes an extending shaft portion that extends in one axial direction from the crankcase, which accommodates a crank portion of the crankshaft. The first and second gearshift clutches are supported by the extending shaft portion. Further, the extending shaft portion is supported by a bearing portion on a side opposite to the crankcase across the first and second gearshift clutches.

According to the foregoing arrangements, the first and second gearshift clutches are disposed on an outside of the crankcase. This helps to reduce a center distance between the crankshaft and the gearshift shaft, which are disposed in parallel with each other, while avoiding interference between the first and second gearshift clutches and the crank portion. Moreover, the extending shaft portion, by which the heavy first and second gearshift clutches are supported, is supported by the crankcase and the bearing portion across the first and second gearshift clutches. Thus, shaft runout of a portion of the extending shaft portion on the side of a shaft end portion can be suppressed.

According to an embodiment of the present invention, the bearing portion is disposed at a projecting portion of a cover that cooperates with the crankcase in defining an accommodation chamber, in which the first and second gearshift clutches are accommodated. The projecting portion projects towards the first and second gearshift clutches.

According to this arrangement, the bearing portion is disposed at the projecting portion. Accordingly, the extending shaft portion is supported by the bearing portion at a position closer to the first and second gearshift clutches. As a result, shaft runout of the extending shaft portion on the side near the shaft end portion can be suppressed even more effectively.

According to an embodiment of the present invention, the bearing portion includes an oil path of a hydraulic oil and the hydraulic oil in the oil path is supplied to the first and second gearshift clutches formed from hydraulic clutches through an in-shaft oil path disposed inside the extending shaft portion.

According to this arrangement, thanks to shaft runout being suppressed at the extending shaft portion, a good sealing performance can be easily achieved in the oil path between the bearing portion as a fixing portion and the extending shaft portion, allowing the hydraulic oil to be reliably supplied to the first and second gearshift clutches.

The following effect can be achieved according to an embodiment of the present invention. More specifically, since the center distance between the crankshaft and the gearshift shaft can be made small, the power unit can be built compactly in a direction of the arrangement of the crankshaft and the gearshift shaft. Thus, the extending shaft portion of the gearshift shaft, on which the heavy first and second gearshift clutches are supported, can be reliably supported.

According to an embodiment of the present invention, the extending shaft portion, at which the first and second gearshift clutches are supported, can be even more reliably supported.

According to an embodiment of the present invention, the hydraulic oil can be reliably supplied to the first and second gearshift clutches. This contributes to an improved operational stability of the first and second gearshift clutches.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A specific embodiment to which the present invention is applied will be described below with reference to FIGS. 1 through 6.

Figure 1:
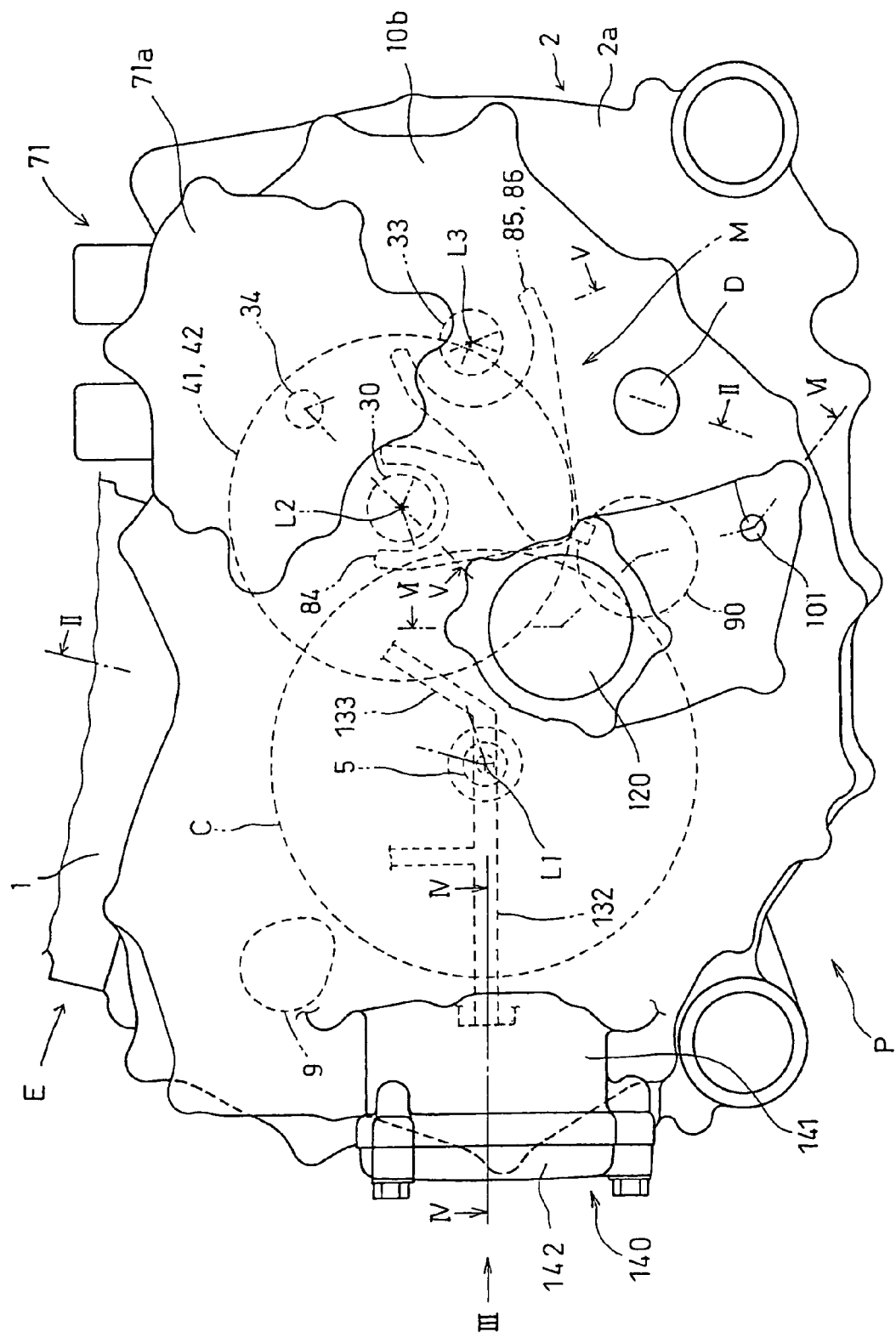
FIG. 1 is a front view showing schematically a principal portion of a power unit including an internal combustion engine and a transmission according to an embodiment of the present invention.
Figures 2A, 2B:
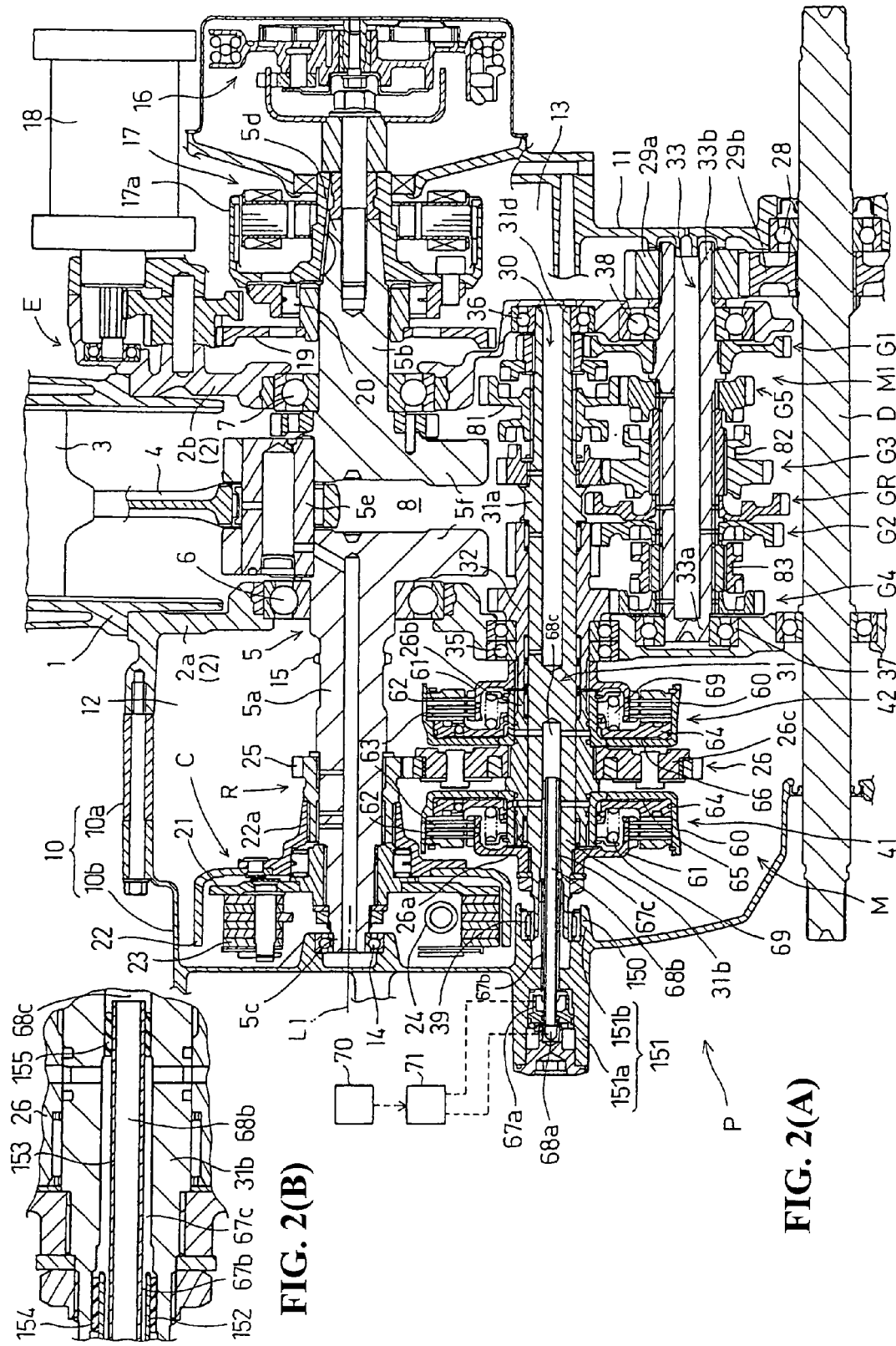
FIG. 2(A) is a schematic cross-sectional view showing a principal portion taken along line II-II of FIG. 1.
FIG. 2(B) is an enlarged view of the principal portion shown in FIG. 2(A)

Referring to FIGS. 1 and 2(A), a power unit P to which the present invention is applied includes an internal combustion engine E as an engine and a power transmission apparatus. The power transmission apparatus includes a gear-type transmission M as an automatic transmission. The power unit P is mounted on a saddle-riding type vehicle for offroad use as a vehicle. The power transmission apparatus includes the gear-type transmission M (hereinafter referred to as "transmission M"), a centrifugal clutch C, and a drive shaft D. The transmission M is a constant-mesh type. The clutch C forms a starting clutch that transmits or cuts off power generated by the internal combustion engine E relative to the transmission M. The drive shaft D receives power wherein the speed is changed by the transmission M. The power reaching the drive shaft D is transmitted to a front wheel and a rear wheel via a front propeller shaft and a rear propeller shaft, respectively. The wheels are thereby rotatably driven.

The internal combustion engine E is a water-cooled, single-cylinder, four-stroke engine. The engine E has an engine body that includes a cylinder 1, a cylinder head and a head cover, and a crankcase 2. The cylinder 1 has a piston 3 reciprocatingly fitted therewithin. The cylinder head and the head cover are connected, the latter on top of the former, to the cylinder 1. The crankcase 2 serves as a casing connected to a lower end portion of the cylinder 1. A crankshaft 5 has a centerline of rotation L1 that is oriented toward a longitudinal direction of a vehicle body. The crankcase 2 rotatably supports the crankshaft 5 via a pair of main bearings 6, 7. The crankcase 2 includes two case half bodies 2a, 2b that are divided into two axially in a direction of the centerline of rotation L1. More specifically, a front case half body 2a and a rear case half body 2b are connected together to form the crankcase 2. The crankcase 2 forms a crank chamber 8, in which a crank portion of the crankshaft 5 is accommodated. The crank portion contains a crankpin 5e and a crank web 5f.

The internal combustion engine E includes an intake valve, an exhaust valve, and a valve actuating mechanism. The intake valve and the exhaust valve open and close an intake port and an exhaust port, respectively, disposed in the cylinder head. The valve actuating mechanism, of an overhead valve type, opens and closes, in synchronism with the rotation of the crankshaft 5, the intake valve and the exhaust valve using a pushrod driven by a valve actuating cam on a camshaft 9. The piston 3 is driven by a combustion pressure generated when a mixture drawn in through the intake port is burned in a combustion chamber formed between the piston 3 and the cylinder head. The piston 3 thereby rotatably drives the crankshaft 5 via a connecting rod 4.

The crankshaft 5 as an output shaft of the internal combustion engine E includes a front extending portion 5a and a rear extending portion 5b. The front extending portion 5a and the rear extending portion 5b extend forwardly and rearwardly, respectively, from the crank chamber 8. It should be noted that "front" and "rear" refer to first and second axial directions of the crankshaft 5. Accordingly, the "front" and "rear" extending portions may be referred, instead, to as "first" and "second" extending portions, respectively.

A front cover 10, which covers the front case half body 2a from a forward direction, is connected to the front case half body 2a. The front case half body 2a and the front cover 10 thus cooperate with each other in defining a front accommodation chamber 12. The front cover 10 includes an annular intermediate cover portion 10a and a front end cover portion 10b. The intermediate cover portion 10a forms a peripheral wall of the front accommodation chamber 12 by being connected to a front end portion of the front case half body 2a. The front end cover portion 10b forms a peripheral wall of the front accommodation chamber 12 by being connected to a front end portion which is an open end portion of the intermediate cover portion 10a.

The front extending portion 5a extending forwardly from the main bearing 6 retained by the front case half body 2a extends in the front accommodation chamber 12. A front shaft end portion 5c of the front extending portion 5a is rotatably supported on the front end cover portion 10b via a bearing 14. A rear cover 11, covering the rear case half body 2b from a rearward direction, is, on the other hand, connected to the rear case half body 2b. The rear case half body 2b and the rear cover 11 cooperate with each other in defining a rear accommodation chamber 13. The rear extending portion 5b extending rearwardly from the main bearing 7 retained by the rear case half body 2b extends in the rear accommodation chamber 13. It is to be noted that the crankcase 2 and the front and rear covers 10, 11 form a housing of the power unit P.

Figure 3:
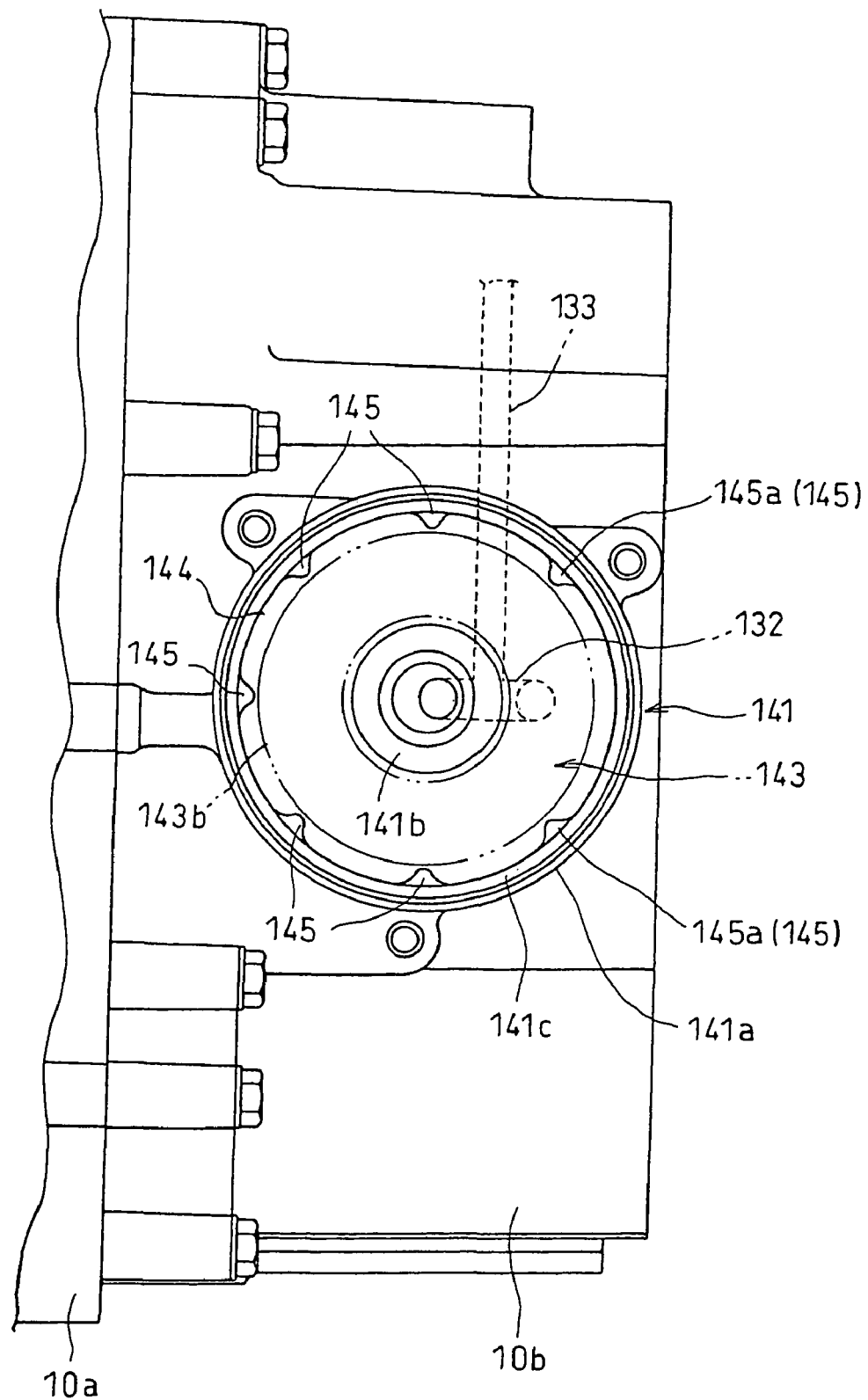
FIG. 3 is a view on arrow III of FIG. 1, showing a principal portion where an oil filter cap is removed.
Figure 4:
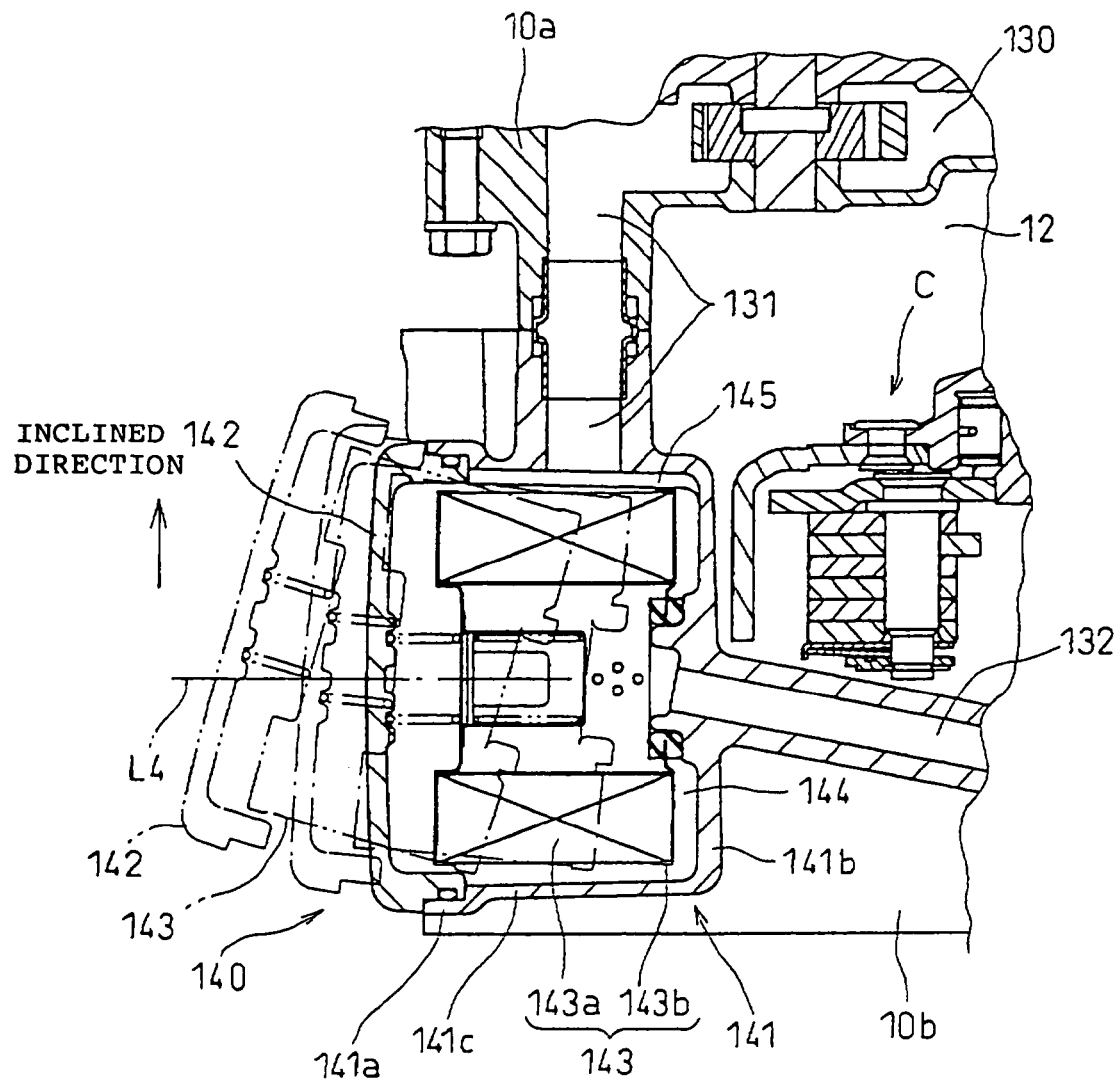
FIG. 4 is a schematic cross-sectional view showing a principal portion taken along line IV-IV of FIG. 1.

Referring to FIGS. 1, 3, and 4, an oil filter 140 is disposed on a side portion of the power unit P on the right of the front end cover portion 10b. Lubricant, which is discharged from an oil pump 130 and flows past a delivery oil path 131, flows through the oil filter 140. The oil pump 130 is disposed at the intermediate cover portion 10a and includes a trochoid pump rotatably driven by the power of the crankshaft 5. More specifically, the oil filter 140 includes a filter case 141, a cap 142, and a filter portion 143. The filter case 141, of a cylindrical shape, is molded integrally with the front end cover portion 10b. The cap 142 is removably attached to the filter case 141 so as to close an open end portion 141a of the filter case 141 opening to the right of the filter case 141. The filter portion 143 is fitted to the cap 142 and accommodated in an accommodation chamber 144 formed in the filter case 141. The filter portion 143 includes a cylindrically formed filter element 143a and a holder 143b. The holder 143b, which retains the filter element 143a, is connected to the cap 142.

The lubricant flows into the accommodation chamber 144 via the delivery oil path 131 that is disposed across the intermediate cover portion 10a and the front end cover portion 10b and opens toward the accommodation chamber 144 at a peripheral wall 141c of the filter case 141. The lubricant is then purified as the lubricant flows past the filter element 143a. The lubricant thereafter flows into a main oil path 132 that opens at a center of a bottom wall 141b of the filter case 141. Lubricant in the main oil path 132 is supplied to different lubrication points of the internal combustion engine E and the transmission M via a large number of oil paths. The lubricant is further supplied to a control valve unit 71 to be described later via an oil path 133.

A plurality of projecting ribs 145 is disposed on an inner peripheral surface having a substantially circular transverse cross section of the peripheral wall 141c. The ribs, spaced apart from each other in a circumferential direction, serve as a control portion restricting oscillations of the filter portion 143 in the accommodation chamber 144 arising from vibration transmitted to the oil filter 140 or the like. Each of the plurality of ribs 145 extends substantially in parallel with a center axis L4 of the cylindrical filter case 141 from a point near the open end portion 141a to the bottom wall 141b.

There may be cases where the filter portion 143 is removed together with the cap 142 from the filter case 141 for replacement of the filter element 143a or the like. If there is not enough space available in a direction parallel with the center axis L4 because of the construction surrounding the oil filter 140 at this time, it is necessary that the filter portion 143 be removed and inserted in a position inclined to a specific direction relative to the filter case 141. If there is a wall or other obstacle present in part of a peripheral direction of the filter case 141 in this case, the direction in which the filter portion 143 is inclined is also restricted.

To solve such a problem as that noted above, the ribs 145 for suppressing vibration at the filter portion 143 are adapted to include a facilitation means that facilitates removal and insertion of the filter portion 143 in a specific inclined direction (see FIG. 4). The facilitation means is formed by eliminating part of the ribs 145 disposed on a side opposite to a side (or a direction) in which the oil filter 140 is inclined in the filter case 141 or keeping an amount of projection of the part of the ribs 145 small. The facilitation means helps lessen restriction on inclination imposed by abutment between the holder 143b and the ribs 145, allowing the filter portion 143 to be inclined at a greater angle. In accordance with the embodiment of the present invention, part of the plurality of ribs 145 to be equally spaced apart from each other, more specifically one of the ribs 145, is eliminated. As a result, a spacing between a specific pair of ribs 145a adjacent circumferentially is adapted to be greater than a spacing between each of the other pairs of ribs 145 that are adjacent circumferentially.

The foregoing arrangement allows the filter portion 143 to be inclined largely during removal and insertion thereof (chain double-dashed lines of FIG. 4 show two conditions during removal.) The arrangement allows for easy removal of the filter portion 143 even with a small space available in the direction of the center axis L4. Moreover, it is easy to check the position of the filter portion 143 relative to the filter case 141 during insertion, allowing the filter portion 143 to be inserted smoothly in the filter case 141. This makes for easy replacement of the filter element 143a and other service jobs performed for the oil filter 140.

Referring to FIG. 2(A), the centrifugal clutch C, a primary reduction mechanism R, and a drive sprocket 15 are disposed in that order from the front shaft end portion 5c on the front extending portion 5a in the front accommodation chamber 12. The drive sprocket 15 forms part of the valve actuating transmission mechanism that rotatably drives the camshaft 9. An ac generator 17 and a starting driven gear 19 are disposed in that order from a rear shaft end portion 5d, to which a recoil starter 16 is connected, on the rear extending portion 5b in the rear accommodation chamber 13. The driven gear 19 forms part of a starting reduction mechanism that transmits rotation of a starter motor 18 mounted to the rear cover 11 to the crankshaft 5. The driven gear 19 is connected to a rotor 17a of the ac generator 17 via a one-way clutch 20.

The centrifugal clutch C includes a plate-like clutch inner 21, a cup-like clutch outer 22, and a clutch shoe 23. The clutch inner 21 serves as an input member rotating integrally with the crankshaft 5. The clutch outer 22 serves as an output member surrounding the clutch inner 21 radially outwardly. The clutch shoe 23, which is pivotally supported on the clutch inner 21, serves as a centrifugal weight that controls a connected or disconnected condition of the centrifugal clutch C using a centrifugal force generated according to a speed of the crankshaft 5 that is an engine speed. When the engine speed exceeds an idling speed, the clutch shoe 23 opposes a snapping force of a clutch spring 24. Then, the centrifugal force causes the clutch shoe 23 to swing radially outwardly of the crankshaft 5, thus to start to contact the clutch outer 22. Power of the internal combustion engine E is thus transmitted from the clutch inner 21 to the clutch outer 22. As the engine speed builds up, the centrifugal clutch C undergoes the following operating stages. More specifically, the clutch C first undergoes a partial engagement stage, in which the clutch outer 22 rotates with a slight slip over the clutch shoe 23. The clutch C then enters a complete engagement stage, in which the clutch inner 21 and the clutch outer 22 rotate integrally.

The primary reduction mechanism R includes a drive gear 25 and a driven gear 26 in mesh with the drive gear 25. The drive gear 25 is relatively rotatably mounted on the front extending portion 5a. Further, the drive gear 25 is a spline fit in a boss portion of the clutch outer 22, being integrally rotatable with the clutch outer 22. The driven gear 26 is relatively rotatably mounted on a first main shaft 31. A second main shaft 32 of the transmission M has a pair of front and rear connection portions 26a, 26b that include boss portions sandwiching a disc-like disc portion 26c on an outer periphery of a first main shaft 31 and extending in a longitudinal direction. Power is transmitted to first and second gearshift clutches 41, 42 of the transmission M via the front connection portion 26a and rear connection portion 26b, respectively. Accordingly, the primary reduction mechanism R serves as a transmission mechanism that transmits power from the centrifugal clutch C to the first and the second gearshift clutches 41, 42.

Figure 5:
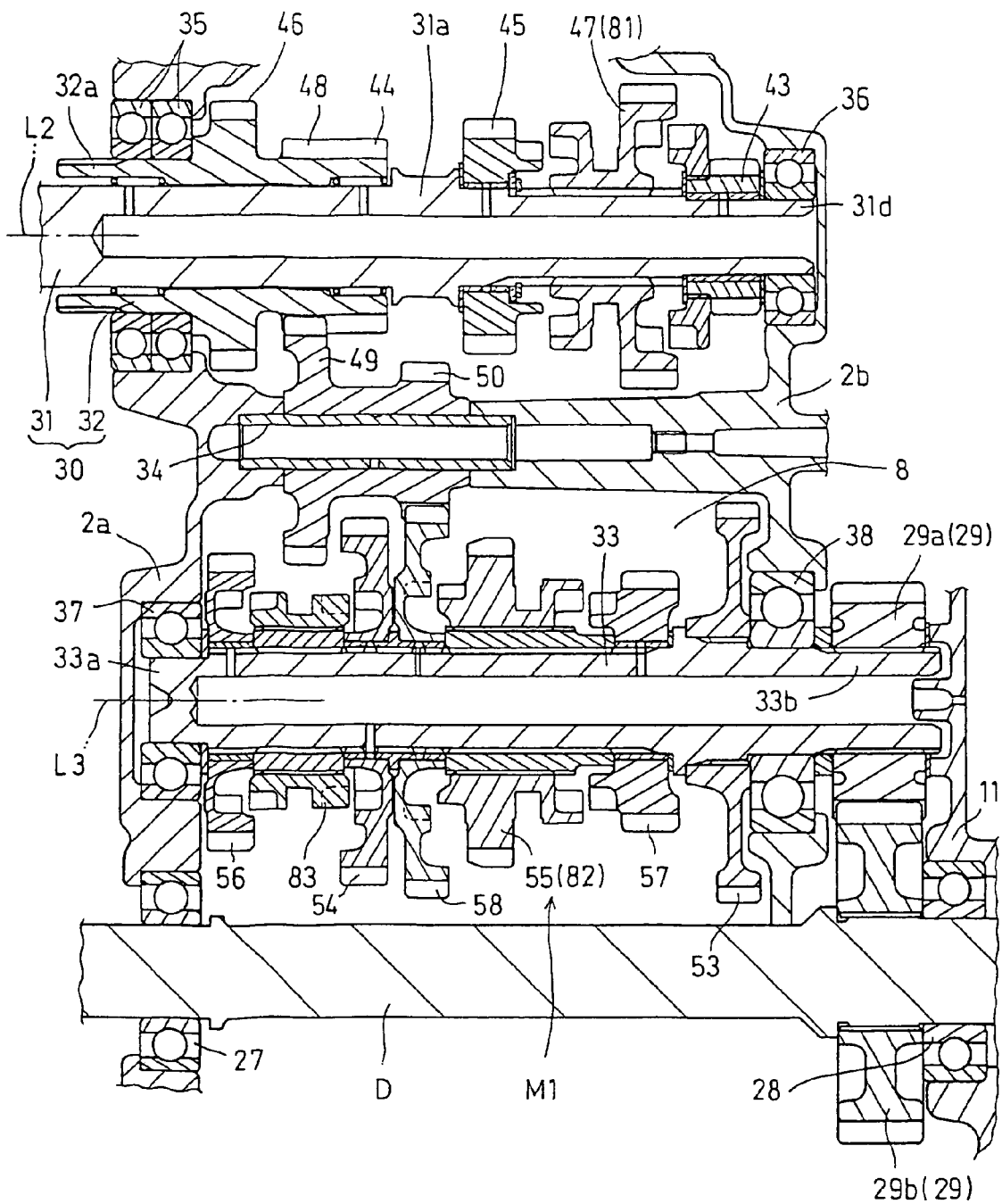
FIG. 5 is a schematic cross-sectional view showing a principal portion taken along line V-V of FIG. 1.

Referring also to FIG. 5, the transmission M includes a main shaft 30, a counter shaft 33, an intermediate shaft 34, a transmission gear train group M1, a gearshift position selector mechanism M2, and the first and second gearshift clutches 41, 42. The main shaft 30 serves as an input shaft, while the counter shaft 33 serves as an output shaft. The main shaft 30 and the counter shaft 33 are rotatably supported by the front case half body 2a and the rear case half body 2b via bearings 35, 36 and 37, 38, respectively. Further the main shaft 30 and the counter shaft 33 have centerlines of rotation L2 and L3, respectively, each extending in parallel with the centerline of rotation L1. The intermediate shaft 34 has both ends thereof fixed to the front case half body 2a and the rear case half body 2b. Further, the intermediate shaft 34 has a center axis that extends in parallel with the centerline of rotation L1. The transmission gear train group M1 is a group of gear trains G1 to G5, and GR that set a gearshift position. The gearshift position selector mechanism M2 (see FIG. 6) selects a specific gearshift position to realize a gearshift at a gear ratio a driver desires. The first and second gearshift clutches 41, 42 transmit or disconnect power from the internal combustion engine E relative to the transmission gear train group M1. In the transmission M, the main shaft 30, the counter shaft 33, the intermediate shaft 34, and the drive shaft D are supported by the crankcase 2 that functions also as a transmission case by being disposed in parallel with the crankshaft 5. The main shaft 30 and the counter shaft 33 constitute gearshift shafts of the transmission M.

The main shaft 30 includes the first main shaft 31 and the second main shaft 32, both being disposed across the crank chamber 8 and the front accommodation chamber 12. The first main shaft 31 is relatively rotatably and coaxially passed through the second main shaft 32 which is a hollow shaft. The first main shaft 31, includes a shaft length longer than the second main shaft 32 for defining the shaft length of the main shaft 30. The first main shaft 31 includes an inner shaft portion 31a and an outer shaft portion 31b. The inner shaft portion 31a is accommodated in the crank chamber 8, while the outer shaft portion 31b is accommodated in the front accommodation chamber 12. The outer shaft portion 31b forms an extending shaft portion that extends through the front accommodation chamber 12 forward in a first direction in an axial direction from the crankcase 2. The outer shaft portion 31b is supported rotatably on the front cover 10 via a bearing 39 at a front shaft end portion 31c as a shaft end portion of the outer shaft portion 31b.

The first gearshift clutch 41, the driven gear 26, and the second gearshift clutch 42 are disposed sequentially in that order from the front shaft end portion 31c toward the crankcase 2 and are supported on the outer shaft portion 31b. Accordingly, the driven gear 26 is disposed between the first and second gearshift clutches 41, 42 in an axial direction of the main shaft 30. The first and second gearshift clutches 41, 42 are mounted on the outer shaft portion 31b via the boss portions of the driven gear 26. A rear shaft end portion 31d of the first main shaft 31 is supported by the rear case half body 2b.

The outer shaft portion 31b is supported in a bearing portion 150 via a bearing 39 on a side opposite axially to the front case half body 2a across the first and second gearshift clutches 41, 42 and at the front shaft end portion 31c. The bearing portion 150 is disposed in an inner projecting portion 151b that axially projects toward the first and second gearshift clutches 41, 42 from an inner surface of the front end cover portion 10b at a projection portion 151 integrally formed at the front end cover portion 10b.

The projection portion 151 includes an outer projecting portion 151a that projects forwardly from an outer surface of the front end cover portion 10b and the inner projecting portion 151b. The outer projecting portion 151a includes oil paths 67a, 68a to be described later. The bearing 39, including a needle bearing supporting the front shaft end portion 31c, is retained in the inner projecting portion 151b that axially projects to a position overlapping the centrifugal clutch C.

Referring to the counter shaft 33 having a front shaft end portion 33a supported by a bearing 37, an output drive gear 29a is disposed on a rear shaft end portion 33b projecting rearwardly from a bearing 38 and extending in the rear accommodation chamber 13. The output drive gear 29a drives the drive shaft D that is rotatably supported by the front case half body 2a and the rear case half body 2b via bearings 27, 28. The output drive gear 29a and an output driven gear 29b disposed on the drive shaft D constitute a secondary reduction mechanism 29. The secondary reduction mechanism 29 serves as a transmission mechanism transmitting power from the transmission M, with a speed thereof reduced, to the drive shaft D. The secondary reduction mechanism 29 is accommodated in the rear accommodation chamber 13.

Referring to FIGS. 2(A) and 5, the transmission gear train group M1 as a group of gearshift elements accommodated in the crank chamber 8 function also as a transmission chamber and include a group of gearshift gears including a predetermined plurality of gearshift gear trains G1 to G5, and GR. The group of gearshift gears includes those gears mounted on the main shaft 30, the counter shaft 33, and the intermediate shaft 34. More specifically, the predetermined plurality of drive gears are disposed on the main shaft 30, that is, drive gears 43 to 48 according to the embodiment of the present invention, the predetermined plurality of driven gears are disposed on the counter shaft 33, that is, driven gears 53 to 58 and intermediate gears 49, 50 as reduction gears are disposed on the intermediate shaft 34.

A first speed gear train G1 that sets a first speed gearshift position includes the drive gear 43 and the driven gear 53. The drive gear 43 is disposed relatively rotatably on the inner shaft portion 31a. The driven gear 53, which meshes with the drive gear 43, is disposed integrally rotatably on the counter shaft 33. A second speed gear train G2 that sets a second speed gearshift position includes the drive gear 44 and the driven gear 54. The drive gear 44 is formed integrally with and disposed integrally rotatably on the second main shaft 32. The driven gear 54, which meshes with the drive gear 44, is disposed relatively rotatably on the counter shaft 33. A third speed gear train G3 that sets a third speed gearshift position includes the drive gear 45 and the driven gear 55. The drive gear 45 is disposed relatively rotatably on the inner shaft portion 31a. The driven gear 55, which meshes with the drive gear 45, is disposed integrally rotatably on the counter shaft 33. A fourth speed gear train G4 that sets a fourth speed gearshift position includes the drive gear 46 and the driven gear 56. The drive gear 46 is formed integrally with and disposed integrally rotatably on the second main shaft 32. The driven gear 56, which meshes with the drive gear 46, is disposed relatively rotatably on the counter shaft 33. A fifth speed gear train G5 that sets a fifth speed gearshift position includes the drive gear 47 and the driven gear 57. The drive gear 47 is disposed integrally rotatably on the inner shaft portion 31a. The driven gear 57, which meshes with the drive gear 47, is disposed relatively rotatably on the counter shaft 33. A reverse gear train GR that sets a reverse gearshift position includes the drive gear 48, the driven gear 58, a first intermediate gear 49, and a second intermediate gear 50. The drive gear 48 is formed integrally with the drive gear 44. The driven gear 58 is disposed relatively rotatably on the counter shaft 33. The first intermediate gear 49, which meshes with the drive gear 48, is disposed relatively rotatably on the intermediate shaft 34. The second intermediate gear 50, which meshes with the driven gear 58, is integrally formed and rotatable with the first intermediate gear 49.

The gear trains G1, G3, and G5 having the drive gears 43, 45, and 47, respectively, disposed on the first main shaft 31 constitute a first transmission portion for changing the speed of power of the internal combustion engine E. The first gearshift clutch 41 transmits or disconnects the power to the first transmission portion. The gear trains G2, G4, and GR having the drive gears 44, 46, 48, respectively, disposed on the second main shaft 32 constitute a second transmission portion that changes the speed of power of the internal combustion engine E. The second gearshift clutch 42 transmits or disconnects the power to the second transmission portion.

The first gearshift clutch 41 is disposed adjacent to the centrifugal clutch C and is closer axially to the front case half body 2a than the centrifugal clutch C. The first gearshift clutch 41 is integrally rotatably connected through a spline fit to the front connection portion 26a on an input side of the power of the internal combustion engine E transmitted via the centrifugal clutch C and the primary reduction mechanism R. Further, the first gearshift clutch 41 is integrally rotatably connected through a spline fit to the outer shaft portion 31b on an output side of the power to the first main shaft 31.

The second gearshift clutch 42, which is disposed on a side opposite axially to the first gearshift clutch 41 across the driven gear 26, is integrally rotatably connected through a spline fit to the rear connection portion 26b on an input side of the power of the internal combustion engine E transmitted via the centrifugal clutch C and the primary reduction mechanism R. Further, the second gearshift clutch 42 is integrally rotatably connected through a spline fit to a front shaft end portion 32a that projects forwardly from a bearing 35 and extends in the front accommodation chamber 12 on an output side of the power to the second main shaft 32.

The two gearshift clutches 41, 42 are a hydraulic type multiple disc friction clutch having the same construction. Each of the gearshift clutches 41, 42 includes a cup-like clutch outer 60, a plurality of first clutch plates 62, a plurality of second clutch plates 63, a clutch inner 61, and a piston 64. The clutch outer 60 serves as an input member disposed integrally rotatably on an outer periphery of the front connection portion 26a or the rear connection portion 26b through a spline fit. The first clutch plates 62 mesh integrally rotatably with the clutch outer 60. Each of the plurality of second clutch plates 63 is disposed alternately between two adjacent ones of the pluralities of first clutch plates 62. The clutch inner 61 serves as an output member that meshes integrally rotatably with the second clutch plates 63. The piston 64 is slidably fit in the clutch outer 60 so as to press such that the first clutch plates 62 and the second clutch plates 63 contact each other.

The clutch outer 60 and the piston 64 form each of hydraulic chambers 65, 66 for the gearshift clutches 41, 42. The hydraulic chamber 65 of the first gearshift clutch 41 is disposed closer axially to the second gearshift clutch 42. The hydraulic chamber 66 of the second gearshift clutch 42 is disposed closer axially to the first gearshift clutch 41. The hydraulic chambers 65, 66 are controlled for pressure through supply and discharge of hydraulic oil relative to the hydraulic chambers 65, 66 through the oil paths 67a, 68a disposed in the front end cover portion 10b and in-shaft oil paths 67c, 68c disposed in the outer shaft portion 31b. When a pressure in the hydraulic chambers 65, 66 builds up to a high level, the gearshift clutches 41, 42 are brought to a connected state. Specifically, the piston opposes a snapping force of a return spring 69 to press the first and second clutch plates 62, 63. Then, friction between the first and second clutch plates 62, 63 causes the clutch outer 60 and the clutch inner 61 to rotate integrally with each other. When the pressure in the hydraulic chambers 65, 66 becomes low, the gearshift clutches are brought to a disconnected state. More specifically, the snapping force of the return spring 69 separates the clutch plates 62, 63. This disconnects transmission of power between the clutch outer 60 and the clutch inner 61.

A hydraulic pressure control apparatus controls the pressure of the hydraulic oil in the hydraulic chambers 65, 66. The hydraulic pressure control apparatus includes the control valve unit 71 that controls the pressure of the hydraulic oil serving as a lubricant introduced through the oil path 133, of the lubricant delivered from the oil pump 130 (see FIG. 4) as a hydraulic oil source, thereby controlling the pressure of each of the hydraulic chambers 65, 66. The control valve unit 71 includes a valve housing 71a (see FIG. 1) and a plurality of hydraulic pressure control valves. The valve housing 71a is mounted on the front end cover portion 10b. The hydraulic pressure control valves are housed in the valve housing 71a. An electronic control unit 70 controls the hydraulic pressure control valves such that the supply and discharge of the hydraulic oil relative to the hydraulic chambers 65, 66 is controlled through an oil supply path having the in-shaft oil paths 67c, 68c disposed in the first main shaft 31. Disconnection and connection, that is, disconnected and connected states of each of the gearshift clutches 41, 42 are thereby controlled.

Referring also to FIG. 2(B), the oil supply path disposed across the inner projecting portion 151b as a fixing member and the outer shaft portion 31b as a rotational member includes the oil paths 67a, 68a, oil paths 67b, 68b, and the in-shaft oil paths 67c, 68c. More specifically, the oil paths 67a, 68a are disposed in the outer projecting portion 151a, into which the hydraulic oil controlled by the hydraulic pressure control valves is guided. The oil paths 67b, 68b are formed by guide pipes 152, 153 inserted and fixed in the outer projecting portion 151a and the inner projecting portion 151b. The in-shaft oil paths 67c, 68c are disposed inside the outer shaft portion 31b. Each of the guide pipes 152, 153 is disposed coaxially about the centerline of rotation L2 and inserted in the outer shaft portion 31b. Annular sealing members 154, 155 are mounted between each of the guide pipes 152, 153 and the outer shaft portion 31b.

In the first gearshift clutch 41, the power from the primary reduction mechanism R is transmitted to the clutch outer 60, while the clutch inner 61 transmits the power to the first main shaft 31. In the second gearshift clutch 42, on the other hand, the power from the primary reduction mechanism R is transmitted to the clutch outer 60, while the clutch inner 61 transmits the power to the second main shaft 32.

The first and second gearshift clutches 41, 42 are disposed between the front case half body 2a and the centrifugal clutch C in the axial direction. A connection portion 22a of the clutch outer 22 of the centrifugal clutch C with the drive gear 25 overlaps substantially entirely with the second gearshift clutch 42 in the axial direction. The clutch inner 61 of the second gearshift clutch 42 is disposed axially near the front case half body 2a, being in contact axially with the bearing 35. Further, the clutch outer 60, which is a member on the side of the driven gear 26 in the first and second gearshift clutches 41, 42, is disposed near the disc portion 26c of the driven gear 26 in the axial direction. In addition, the first and second gearshift clutches 41, 42 and the driven gear 26 overlap with the crankpin 5e and the crank web 5f in a radial direction of the main shaft 30.

Referring also to FIG. 1, the first and second gearshift clutches 41, 42 are disposed at a position, at which the clutches 41, 42 overlap with the centrifugal clutch C as viewed from the axial direction. In a radial direction of the front extending portion 5a, the clutch outer 60, as a member having the largest outside diameter in the second gearshift clutch 42, is disposed near the connection portion 22a. The clutch outer 22, as a member having the largest outside diameter in the centrifugal clutch C, is disposed near the outer shaft portion 31b. Further, as viewed from the axial direction, the clutch outer 22 of the centrifugal clutch C is radially disposed at a position overlapping with an inner peripheral portion of the clutch outer 60 or an inner peripheral portion of the piston 64.

Figure 6:
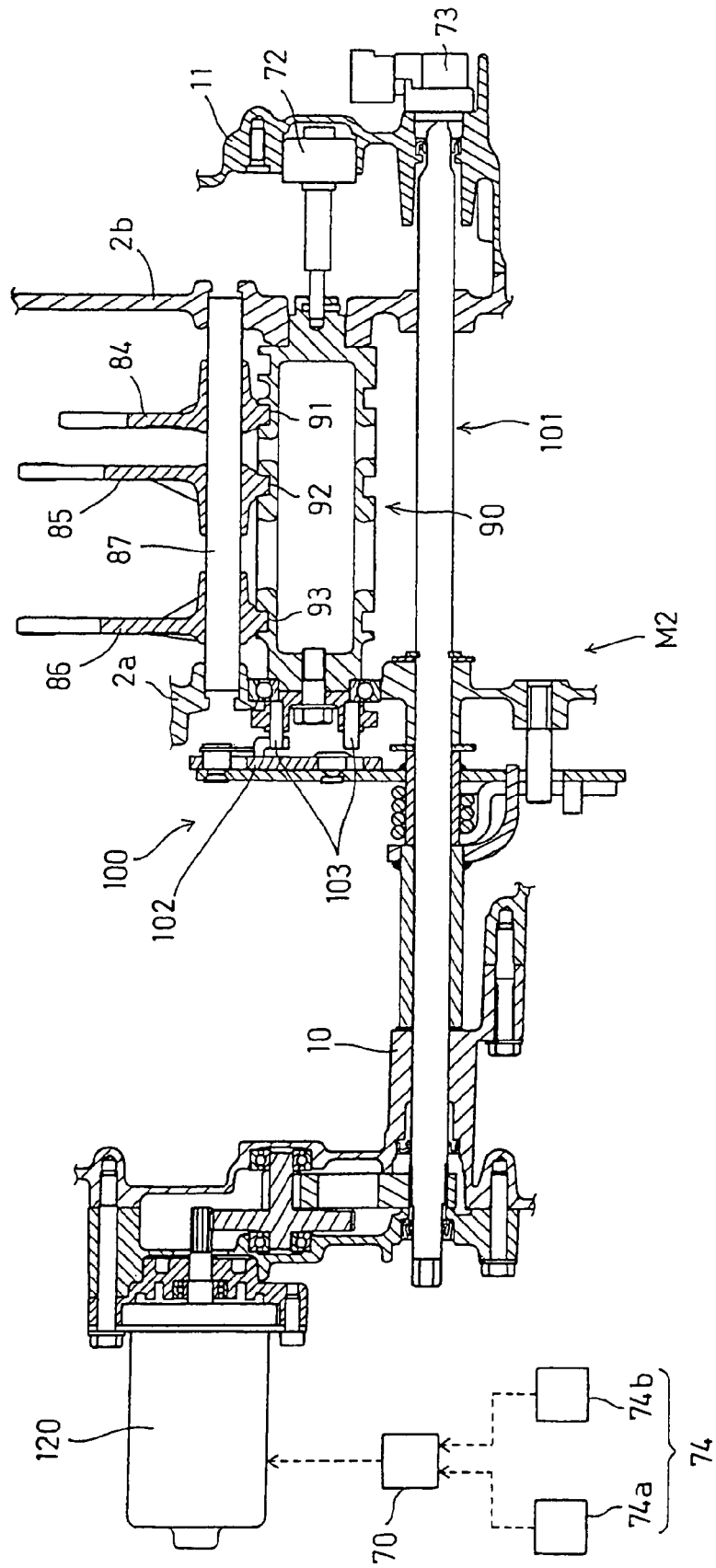
FIG. 6 is a schematic cross-sectional view showing a principal portion taken along line VI-VI of FIG. 1.

Referring to FIGS. 2(A), 5, and 6, the gearshift position selector mechanism M2 includes a plurality of shifters 81 to 83, a plurality of shift forks 84 to 86, a shift drum 90, an intermittent feed mechanism 100, and an electric motor 120. More specifically, the plurality of shifters 81 to 83 (there are three according to the embodiment of the present invention) is axially movable on the main shaft 30 or the counter shaft 33 so as to set the gear trains G1 to G5, GR in a connected state, in which the gear train is integrally rotatable with the main shaft 30 or the counter shaft 33, or a disconnected state, in which the gear train is relatively rotatable with the main shaft 30 or the counter shaft 33, thereby allowing a gearshift position to be selected. The plurality of shift forks 84 to 86, which corresponds in number with the shifters 81 to 83 and there are three according to the embodiment of the present invention, is axially slidably supported on a support shaft 87 that is supported in the front case half body 2a and the rear case half body 2b so as to move the shifters 81 to 83. The shift drum 90 includes cam grooves 91 to 93 formed on an outer peripheral surface thereof. The cam grooves 91 to 93 serve as guide portions for guiding and moving each of the shifters 81 to 83 by guiding and moving axially a corresponding one of the shift forks 84 to 86. The intermittent feed mechanism 100 intermittently rotates the shift drum 90. The electric motor 120, capable of rotating backward, operates the intermittent feed mechanism 100 based on the operating conditions of the vehicle.

The three shifters 81 to 83 having projections to be engaged with gears making up the gear trains G1 to G5, GR include a first shifter 81, a second shifter 82, and a third shifter 83. The first shifter 81 is for selecting a first or third speed. The second shifter 82 is for selecting a fifth or reverse speed. The third shifter 83 is for selecting a second or fourth speed. The shift forks 84 to 86 include a first shift fork 84 engaged with the first shifter 81, a second shift fork 85 engaged with the second shifter 82, and a third shift fork 86 engaged with the third shifter 83. Each of the shift forks 84 to 86, which moves by being guided along a corresponding one of the cam grooves 91 to 93 according to rotation of the shift drum 90, moves a corresponding one of the shifters 81 to 83 to a selected position achieving the connected state or a neutral position achieving the disconnected state.

The first shifter 81, which includes the drive gear 47 functioning also as a shifter, is axially movably disposed in a spline fit in the inner shaft portion 31a between the drive gear 43 and the drive gear 45. When the drive gear 47 (the first shifter 81) moves rearwardly to a selected position and is engaged with the drive gear 43, the first speed gear train G1 (first speed gearshift position) is selected. When the drive gear 47 moves forwardly to another selected position and is engaged with the drive gear 45, the third speed gear train G3 (third speed gearshift position) is selected.

The second shifter 82, which includes the driven gear 55 functioning also as a shifter, is axially movably disposed in a spline fit in the counter shaft 33 between the driven gear 57 and the driven gear 58. When the driven gear 55 (the second shifter 82) moves rearwardly to a selected position and is engaged with the driven gear 57, the fifth speed gear train G5 (fifth speed gearshift position) is selected. When the driven gear 55 moves forwardly to another selected position and is engaged with the driven gear 58, the reverse gear train GR for reversing the vehicle is selected.

The third shifter 83 is axially movably disposed in a spline fit in the counter shaft 33 between the driven gear 54 and the driven gear 56. When the third shifter 83 is engaged with the driven gear 54, the second speed gear train G2 is selected. When the third shifter 83 moves forwardly to another selected position and is engaged with the driven gear 56, the fourth speed gear train G4 (fourth speed gearshift position) is selected.

When each of the shifters 81 to 83 occupies a neutral position, none of the gear trains G1 to G5, GR (gearshift position) is selected, leaving the transmission M in a neutral position.

Referring to FIG. 6, the shift drum 90 having a centerline of rotation that extends in parallel with the centerlines of rotation L1 to L3 is rotated forward or backward intermittently by the intermittent feed mechanism 100. The intermittent feed mechanism 100 includes a shift spindle 101 rotatably driven by the electric motor 120 and a shifter plate 102 that is to be engaged with a plurality of feed pins 103 integrated with the shift drum 90. The shift drum 90 thereby occupies the aforementioned predetermined number of, that is, six according to the embodiment of the present invention, angular positions that establish the gearshift positions of the transmission M. In response to rotation of the shift drum 90, each of the shift forks 84 to 86 is guided along the corresponding one of the cam grooves 91 to 93 to move axially. This allows an alternative selection of each of the gear trains G1 to G5, GR corresponding to each of the aforementioned predetermined angular positions to be made. Each of the predetermined angular positions is detected by an angular position detector 72 including a potentiometer. In addition, the rear cover 11 includes an angular position detector 73 including a potentiometer mounted thereon, the detector 73 detecting an angular position of the shift spindle 101.

The electronic control unit 70, which controls the connected and disconnected state of the first and second gearshift clutches 41, 42 and the amount and direction of rotation of the electric motor 120, receives inputs of signals from an operating state detection means 74 and the two angular position detectors 72, 73. The operating state detection means 74 detects the operating condition of the internal combustion engine E and the vehicle. The operating state detection means 74 includes a vehicle speed detection means 74a and an accelerator opening detection means 74b that detects load on the internal combustion engine E. Based on the signal from the operating state detection means 74, the electronic control unit 70 rotatably drives the shift spindle 101, thereby automatically controlling the gearshift position of the transmission M according to the operating condition. Further, the electronic control unit 70 provides a feedback control of the angular position of the shift spindle 101 based on the angular position detected by the angular position detector 73.

The operation and effects of the embodiment of the present invention as described heretofore is described below.

The main shaft 30 as the gearshift shaft of the transmission M includes the outer shaft portion 31b that extends from the crankcase 2 accommodating the crank portion of the crankshaft 5. The first and second gearshift clutches 41, 42 and the driven gear 26 are supported by the outer shaft portion 31b. The outer shaft portion 31b is supported by the bearing portion 150 on the side opposite to the crankcase 2 across the first and second gearshift clutches 41, 42. Accordingly, the first and second gearshift clutches 41, 42 are disposed on an outside of the crankcase 2. Consequently, the center distance between the crankshaft 5 and the main shaft 30, which are disposed in parallel with each other, can be made small, while avoiding interference between the first and second gearshift clutches 41, 42 and the crank portion. Moreover, the outer shaft portion 31b, which supports the heavy first and second gearshift clutches 41, 42, and the driven gear 26, is supported by the crankcase 2 and the bearing portion 150 across the first and second gearshift clutches 41, 42. This suppresses shaft runout at a portion of the outer shaft portion 31b near the front shaft end portion 31c. As a result, the center distance between the crankshaft 5 and the main shaft 30 can be made small, which allows the power unit P to be built compactly in a direction of arrangement of the crankshaft 5 and the main shaft 30. Further, the outer shaft portion 31b of the main shaft 30, on which the heavy first and second gearshift clutches 41, 42 are supported, can be reliably supported.

It is to be noted herein that the direction of arrangement refers to a direction, in which the main shaft 30 is disposed relative to the crankshaft 5. More specifically, the direction refers to a direction that is orthogonal to the centerlines of rotation L1, L2 in a plane including the centerlines of rotation L1, L2.

The bearing portion 150 is disposed at the inner projecting portion 151b of the front cover 10 that cooperates with the crankcase 2 in defining the front accommodation chamber 12, in which the first and second gearshift clutches 41, 42 are accommodated. The inner projecting portion 151b projects toward the first and second gearshift clutches 41, 42, by which the bearing portion 150 is disposed at the inner projecting portion 151b. Accordingly, the outer shaft portion 31b is supported by the bearing portion 150 at a position closer to the first and second gearshift clutches 41, 42. Shaft runout of the outer shaft portion 31b at a portion on the side of the front shaft end portion 31c can therefore be suppressed even more effectively. Thus, the outer shaft portion 31b can be even more reliably supported.

The bearing portion 150 includes the oil paths for hydraulic oil. The hydraulic oil in the oil paths is supplied to the first and second gearshift clutches 41, 42 through the in-shaft oil paths 67c, 68c disposed in the outer shaft portion 31b. Further, shaft runout is suppressed in the outer shaft portion 31b. Accordingly, it becomes easier to ensure good sealing performance of the oil path between the bearing portion 150 as a fixing member and the outer shaft portion 31b as a rotational member. The hydraulic oil is therefore reliably supplied to the first and second gearshift clutches 41, 42. This contributes to the improved operational stability of the first and second gearshift clutches 41, 42.

Another embodiment of the present invention having some parts of the first embodiment of the present invention modified will be described.

The transmission may be arranged such that the first and second gearshift clutches are supported by the counter shaft. The transmission may also be a manual type. The internal combustion engine may even be a multi-cylinder internal combustion engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit, comprising:
    an engine having a crankcase rotatably supporting a crankshaft; and
    a transmission for changing a speed of power of the crankshaft, the transmission including:
        a gearshift shaft disposed in parallel with the crankshaft and rotatably supported in the crankcase;
        first and second gearshift portions for changing a speed of the power from the crankshaft;
        a first gearshift clutch transmitting and disconnecting the power relative to the first gearshift portion;
        a second gearshift clutch transmitting and disconnecting the power relative to the second gearshift portion, the first and second gearshift clutches changing a gearshift position in the first gearshift portion and a gearshift position in the second gearshift portion,
    wherein the gearshift shaft includes an extending shaft portion extending in a first axial direction from the crankcase accommodating a crank portion of the crankshaft;
    wherein the first and second gearshift clutches are supported by the extending shaft portion;
    wherein the extending shaft portion is supported by a bearing portion on a side opposite to the crankcase across the first and second gearshift clutches; and
    a front connection portion is operatively connected to said first gearshift clutch and a second connection portion is operatively connected to said second gearshift clutch and a centrifugal clutch mounted on the crankshaft for transmitting power to said first and second gearshift clutches.

2. The power unit according to claim 1, wherein the first gearshift clutch, a driven gear and the second gearshift clutch are disposed sequentially in that order from a front of the gearshift shaft towards the crankcase and are supported on the extending shaft portion of the gearshift shaft.

3. The power unit according to claim 1, wherein said bearing portion includes an outer portion projecting forwardly from a front cover crankcase and an inner portion projecting rearwardly of the front cover and further including a bearing operatively mounted relative to said inner portion for supporting said gearshift shaft.

4. The power unit according to claim 1,
    wherein the bearing portion is disposed at a projecting portion of a cover that cooperates with the crankcase in defining an accommodation chamber, in which the first and second gearshift clutches are accommodated; and
    wherein the projecting portion projects toward the first and second gearshift clutches.

5. The power unit according to claim 4,
    wherein the bearing portion includes an oil path for hydraulic oil; and
    wherein the hydraulic oil in the oil path is supplied to the first and second gearshift clutches formed from hydraulic clutches through an in-shaft oil path disposed inside the extending shaft portion.

6. The power unit according to claim 1, wherein the transmission includes a main shaft, a counter shaft and an intermediate shaft, the first and second gearshift portions, a gearshift position selector mechanism and the first and second gearshift clutches.

7. The power unit according to claim 6, wherein the main shaft is an input shaft and the counter shaft is an output shaft.

8. The power unit according to claim 1,
    wherein the bearing portion includes an oil path for hydraulic oil; and
    wherein the hydraulic oil in the oil path is supplied to the first and second gearshift clutches formed from hydraulic clutches through an in-shaft oil path disposed inside the extending shaft portion.

9. The power unit according to claim 8, wherein the bearing portion on the side opposite the crankcase includes a projecting portion and the oil paths are connected to said projecting portion and are formed by guide pipes for supplying hydraulic oil inside the gearshift shaft in a coaxial manner about a centerline of rotation of the gearshift shaft with annular sealing members being mounted between each guide pipe and an outer shaft portion of the gearshift shaft.

10. A power unit, comprising:
an engine having a crankcase rotatably supporting a crankshaft; and
a transmission for changing a speed of power of the crankshaft, the transmission including:
   a gearshift shaft disposed in parallel with the crankshaft and rotatably supported in the crankcase, said gearshift shaft including an extending shaft portion;
   at least first and second gearshift portions for changing a speed of the power from the crankshaft;
   a first gearshift clutch transmitting and disconnecting the power relative to the first gearshift portion; and
   a second gearshift clutch transmitting and disconnecting the power relative to the second gearshift portion, the first and second gearshift clutches changing a gearshift position in the first gearshift portion and a gearshift position in the second gearshift portion,
said extending shaft portion extending in a first axial direction and being supported by a bearing portion on a front cover; and
said first and second gearshift clutches being supported by the extending shaft portion;
   wherein the first gearshift clutch, the driven gear and the second gearshift clutch are disposed sequentially in that order from a front of the gearshift shaft towards the crankcase and are supported on the extending shaft portion of the gearshift shaft.

11. The power unit according to claim 10 and further including a front connection portion operatively connected to said first gearshift clutch and a second connection portion operatively connected to said second gearshift clutch and a centrifugal clutch for transmitting power to said first and second gearshift clutches.

12. The power unit according to claim 10 wherein said bearing portion includes an outer portion projecting forwardly from a front cover and an inner portion projecting rearwardly of the front cover and further including a bearing operatively mounted relative to said inner portion for supporting said gearshift shaft.

13. The power unit according to claim 10,
   wherein the bearing portion includes an fluid path for hydraulic fluid; and
   wherein the hydraulic fluid in the fluid path is supplied to the first and second gearshift clutches formed from hydraulic clutches through an in-shaft fluid path disposed inside the extending shaft portion.

14. The power unit according to claim 13, wherein the bearing portion on the side opposite the crankcase includes a projecting portion and the fluid paths are connected to said projecting portion and are formed by guide pipes for supplying hydraulic fluid through said in-shaft fluid path in a coaxial manner about a centerline of rotation of the gearshift shaft with annular sealing members being mounted between each guide pipe and an outer shaft portion of the gearshift shaft.

15. The power unit according to claim 10
   wherein the bearing portion is disposed at a projecting of the front cover that cooperates with the crankcase in defining an accommodation chamber, in which the first and second gearshift clutches are accommodated; and
   wherein the projection portion projects toward the first and second gearshift clutches.

16. The power unit according to claim 15,
   wherein the bearing portion includes an fluid path for hydraulic fluid; and
   wherein the hydraulic fluid in the fluid path is supplied to the first and second gearshift clutches formed from hydraulic clutches through an in-shaft fluid path disposed inside the extending shaft portion.

17. The power unit according to claim 10, wherein the transmission includes a main shaft, a counter shaft and an intermediate shaft, the first and second gearshift portions, a gearshift position selector mechanism and the first and second gearshift clutches.

18. The power unit according to claim 17 wherein the main shaft is an input shaft and the counter shaft is an output shaft.

19. A power unit, comprising:
an engine having a crankcase rotatably supporting a crankshaft;
a transmission for changing a speed of power of the crankshaft, the transmission including:
   a gearshift shaft disposed in parallel with the crankshaft and rotatably supported in the crankcase;
   first and second gearshift portions for changing a speed of the power from the crankshaft;
   a first gearshift clutch transmitting and disconnecting the power relative to the first gearshift portion;
   a second gearshift clutch transmitting and disconnecting the power relative to the second gearshift portion, the first and second gearshift clutches changing a gearshift position in the first gearshift portion and a gearshift position in the second gearshift portion;
said gearshift shaft includes an extending shaft portion extending in a first axial direction from the crankcase accommodating a crank portion of the crankshaft;
said first and second gearshift clutches are supported by the extending shaft portion;
said extending shaft portion is supported by a bearing portion on a side opposite to the crankcase across the first and second gearshift clutches;
said bearing portion includes an oil path for hydraulic oil, wherein the hydraulic oil in the oil path is supplied to the first and second gearshift clutches formed from hydraulic clutches though an in-shaft oil path disposed inside the extending shaft portion; and
said bearing portion on the side opposite the crankcase includes a projecting portion and the oil paths are connected to said projecting portion and are formed by guide pipes for supplying hydraulic oil inside the gearshift shaft in a coaxial manner about a centerline of rotation of the gearshift shaft with annular sealing members being mounted between each guide pipe and an outer shaft portion of the gearshift shaft.

* * * * *